J. F. O'CONNOR.
FRICTION DRAFT RIGGING.
APPLICATION FILED JULY 24, 1911.
1,151,379.
Patented Aug. 24, 1915.
2 SHEETS—SHEET 1.
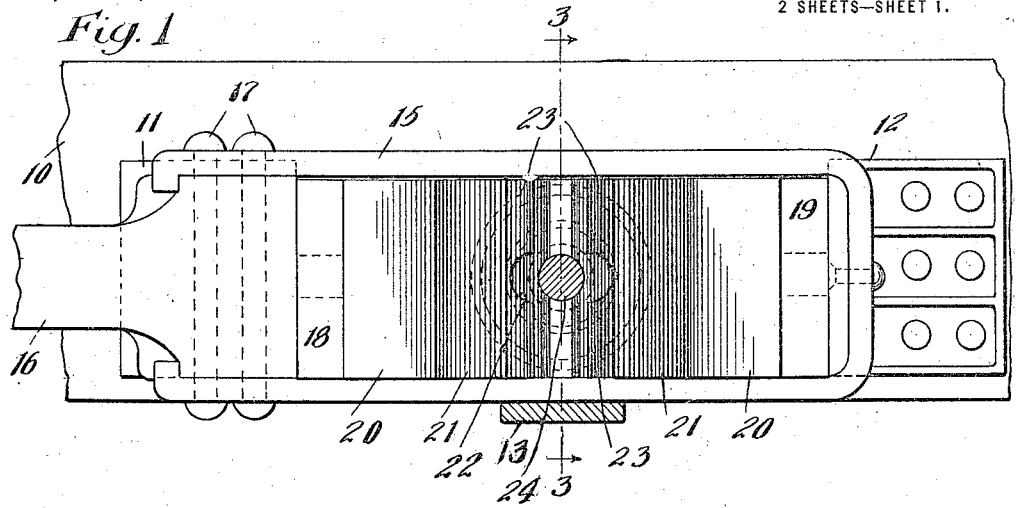
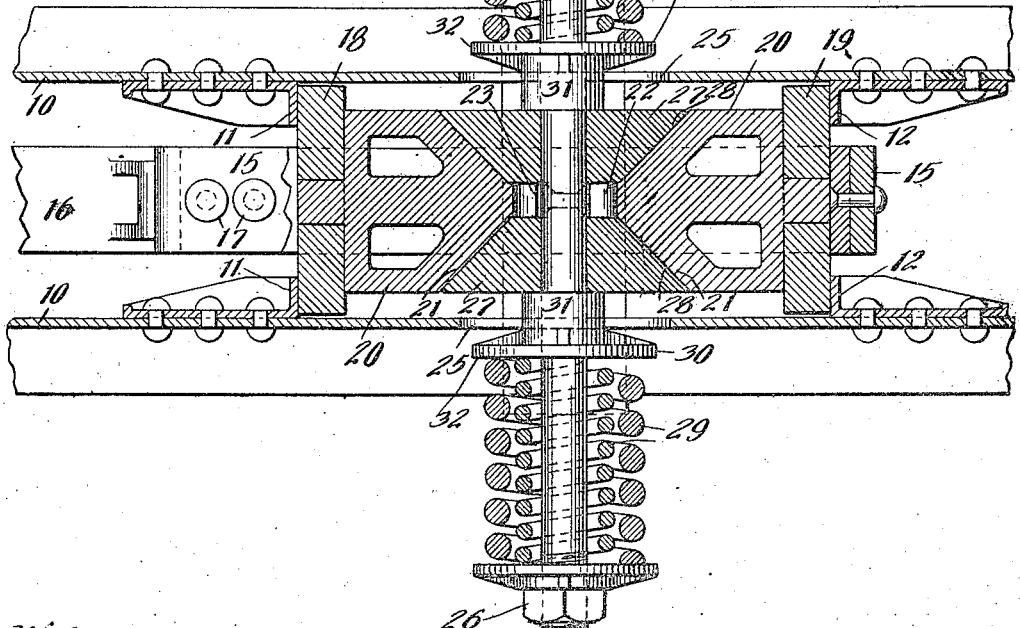
Witnesses:
Wm. Geiger
H. W. Munday
Inventor:
John F. O'Connor
By Munday, Evarts, Adcock & Clarke,
Attys

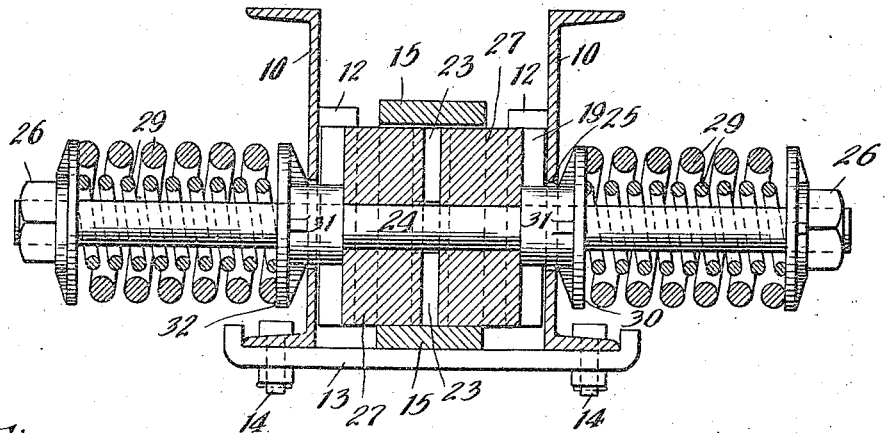

UNITED STATES PATENT OFFICE.

JOHN F. O'CONNOR, OF CHICAGO, ILLINOIS, ASSIGNOR TO WILLIAM H. MINER, OF CHICAGO, ILLINOIS.

FRICTION DRAFT-RIGGING.

1,151,379.　　　Specification of Letters Patent.　　Patented Aug. 24, 1915.

Application filed July 24, 1911. Serial No. 640,079.

*To all whom it may concern:*

Be it known that I, JOHN F. O'CONNOR, a citizen of the United States, residing in Chicago, in the county of Cook and State of Illinois, have invented a new and useful Improvement in Friction Draft-Rigging, of which the following is a specification.

This invention relates to improvements in friction draft rigging.

The same consists in connection with the draft yoke and draw-bar, of a pair of followers having attached thereto on their inner faces wedges engaging a pair of oppositely disposed wedge shaped friction shoes, slidably mounted on a transverse, horizontally extending rod, and said wedges furthermore having stops on their inner ends which are adapted to pass by the supporting rod to limit the inward movement of the wedges and to take the shock off of the bolt and the springs.

My invention consists in the novel parts and devices and in the novel combinations of parts and devices herein shown, described and claimed.

In the accompanying drawing forming a part of this specification, Figure 1 is an elevation, partly in vertical, cross section, of a device embodying my invention. Fig. 2 is a plan view of the same, partly in horizontal, longitudinal section. Fig. 3 is a transverse, vertical section taken on the line 3—3 of Fig. 1. Fig. 4 is an end view of one of the wedge blocks. Fig. 5 is a view similar to Fig. 2, showing another form of my invention, and Fig. 6 is a side view of the wedge used in the structure shown in Fig. 5.

In the drawing, 10, 10 are the center sills, provided with the front stops 11 and the rear stops 12. Slidably mounted between these center sills and supported therein by the saddle plate 13, removably attached thereto by bolts 14, is the yoke 15, rigidly connected to the draw-bar 16 by means of fastening devices, such as the rivets 17, 17. Within the yoke are the front and rear followers 18, 19, respectively, having preferably removably attached to their inner faces, wedges 20. These wedges are each provided with inclined or wedging faces 21, and a cylindrical, horizontally extending recess 22 at their inner ends. The upper and lower horizonally projecting portions 23 formed by this recess are adapted to pass by the transversely extending bolt 24, and said projections 23 are so constructed that they contact upon an extreme inward movement of the wedges and thus take the shock off of the bolt and limit the inward movement of the wedges. The bolt 24 which extends transversely through slots 25 in the center sills 10 has at each end thereof an adjustable nut 26 and on the central portion of the rod 24 are slidably mounted oppositely disposed friction shoes or blocks 27, having inclined or wedging faces 28 contacting the friction faces 21 of the wedges 20. These friction shoes or blocks 27 are maintained in their inward position by means of springs 29 mounted on the rod 24, and between the inner ends of these springs 29 and the friction shoes 27 are slidably mounted on the rod 24, spring washers 30, each having an inner hub portion 31 adapted to slide within the slots 25 of the center sills, and a flange 32.

In the structure shown in Figs. 5 and 6, the wedge members 33 are removably attached to the front and rear followers 18 and 19 by means of a lug and socket connection 34. These wedge members 33 are each provided with inwardly and horizontally extending spaced limiting stops 35, similar to the limiting stops 23 of the wedges 20. Instead of using a single transversely arranged rod, as in the structure shown in the first four figures, applicant employs two laterally extending rods 24′ longitudinally offset and each provided with an angular head 36 seated in a similarly formed socket 37 on the outer face of each of the wedge members 38. These rods 24′ pass through holes 39 in each of the wedge members provided with a socket 37 and an alining bolt hole 40 in the opposite wedge member. The rods 24′ are furthermore provided with draft springs, nuts and washers similar to those shown in the other views. By means of the arrangement shown in Fig. 5, applicant provides for double the capacity of the structure shown in the first four figures, since by an inward movement of the wedge members 33 equal to a corresponding movement of either of the wedges 20, double the amount of compression is produced in each of the springs, as when a single rod is used.

I claim:—

1. In a draft rigging, the combination with the draw-bar, draw-bar yoke, center sills and stops, of followers, a wedge, friction shoes each having inclined end friction faces and a horizontally disposed hole therethrough and an angular socket and bolt hole, oppositely and laterally extending rods each having a head socketed in one of the friction shoes and passing through the hole in the other shoe, and a spring and nut on the exterior portion of each rod, substantially as specified.

2. In a draft rigging, the combination with center sills having slots, of followers, wedges, friction shoes, laterally extending rods passing through said slots, said rods being longitudinally offset, and springs mounted on said rods, substantially as specified.

3. In a draft rigging, the combination with the draw-bar, draw-bar yoke, center sills and stops, of followers, wedges, friction shoes or blocks coöperating therewith and adapted to move transversely and each having inclined end friction faces, offset rods each extending from one of the friction shoes and passing through a hole in the other shoe, and through a slot in the center sill, and springs, substantially as specified.

4. In a draft rigging, the combination with the draw-bar, draw-bar yoke, center sills and stops, of followers, wedges, friction shoes or blocks coöperating therewith and adapted to move transversely and each having inclined end friction faces, offset rods each extending from one of the friction shoes and passing through a hole in the other shoe, and through a slot in the center sill, and springs, said wedges each being provided with inwardly extending limiting stops passing by said bolts and adapted to contact at their extreme inner position, substantially as specified.

5. In a draft rigging, the combination with the draw-bar, draw-bar yoke, center sills and stops, of followers, wedges, each wedge having vertical, inclined friction faces, and spaced, horizontally and inwardly projecting upper and lower limiting stops, the stops of one wedge adapted to contact those of the other wedge upon an inward movement of either wedge, friction shoes mounted on longitudinally offset rods, said rods being located between the limiting stops on the wedges, and springs, substantially as specified.

JOHN F. O'CONNOR.

Witnesses:
 PEARL ABRAMS,
 H. M. MUNDAY.